(12) United States Patent
Fukunaga et al.

(10) Patent No.: US 11,976,208 B2
(45) Date of Patent: May 7, 2024

(54) HARD-COAT COMPOSITION, LAMINATE FILM, AND CURABLE FILM

(71) Applicant: MITSUBISHI GAS CHEMICAL COMPANY, INC., Tokyo (JP)

(72) Inventors: Yasutaka Fukunaga, Tokyo (JP); Fumiaki Kakeya, Tokyo (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 718 days.

(21) Appl. No.: 17/264,008

(22) PCT Filed: Aug. 5, 2019

(86) PCT No.: PCT/JP2019/030745
§ 371 (c)(1),
(2) Date: Jan. 28, 2021

(87) PCT Pub. No.: WO2020/031967
PCT Pub. Date: Feb. 13, 2020

(65) Prior Publication Data
US 2021/0324223 A1    Oct. 21, 2021

(30) Foreign Application Priority Data
Aug. 8, 2018 (JP) .................... 2018-149540

(51) Int. Cl.
| | | |
|---|---|---|
| *C09D 7/47* | (2018.01) | |
| *C08J 7/046* | (2020.01) | |
| *C08K 3/36* | (2006.01) | |
| *C09D 7/40* | (2018.01) | |
| *C09D 7/62* | (2018.01) | |
| *C09D 133/06* | (2006.01) | |
| *C09D 133/08* | (2006.01) | |
| *C09D 135/02* | (2006.01) | |

(52) U.S. Cl.
CPC ............ *C09D 133/08* (2013.01); *C08J 7/046* (2020.01); *C08K 3/36* (2013.01); *C09D 7/47* (2018.01); *C09D 7/62* (2018.01); *C09D 7/67* (2018.01); *C09D 133/068* (2013.01); *C09D 135/02* (2013.01); *C08J 2433/08* (2013.01); *C08J 2433/14* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 2013/0120838 A1* | 5/2013 | Kim .................... | C09D 135/02 977/773 |
| 2016/0326383 A1 | 11/2016 | Pokorny et al. | |
| 2017/0368806 A1 | 12/2017 | Shin et al. | |

FOREIGN PATENT DOCUMENTS

| | | |
|---|---|---|
| EP | 3407097 A1 | 11/2018 |
| JP | 2014-162889 A | 9/2014 |
| JP | 2014-193524 A | 10/2014 |
| JP | 2016-008251 A | 1/2016 |
| JP | 2017-508828 A | 3/2017 |
| WO | WO 2006/102383 A1 | 9/2006 |
| WO | WO 2014/011731 A1 | 1/2014 |
| WO | 2015/045200 A1 | 4/2015 |
| WO | 2015/198787 A1 | 12/2015 |
| WO | 2016/103957 A1 | 6/2016 |
| WO | 2018/038101 A1 | 3/2018 |

OTHER PUBLICATIONS

International Search Report issued in International Patent Application. No. PCT/JP2019/030745, dated Sep. 10, 2019, along with an English translation thereof.
Written Opinion of the International Searching Authority issued in International Patent Application No. PCT/JP2019/030745, dated Sep. 10, 2019, along with an English translation thereof.
EESR for EP App. No. 19847684.8, dated Mar. 21, 2022.

* cited by examiner

*Primary Examiner* — Sheeba Ahmed
(74) *Attorney, Agent, or Firm* — Greenblum & Bernstein, P.L.C

(57) ABSTRACT

The purpose of this invention is to provide: a hard-coat composition with which it is possible to produce a hard-coat layer having excellent hardness and abrasion-resistance when cured, and having excellent moldability during processing; and a laminate film and the like having such a hard-coat composition. This problem is solved by a curable hard-coat composition containing a (meth)acryloyl polymer and inorganic oxide nanoparticles, wherein the (meth)acryloyl polymer has a (meth)acrylic equivalent of 200-500 g/eq and a weight-average molecular weight of 5,000-200,000.

19 Claims, 1 Drawing Sheet

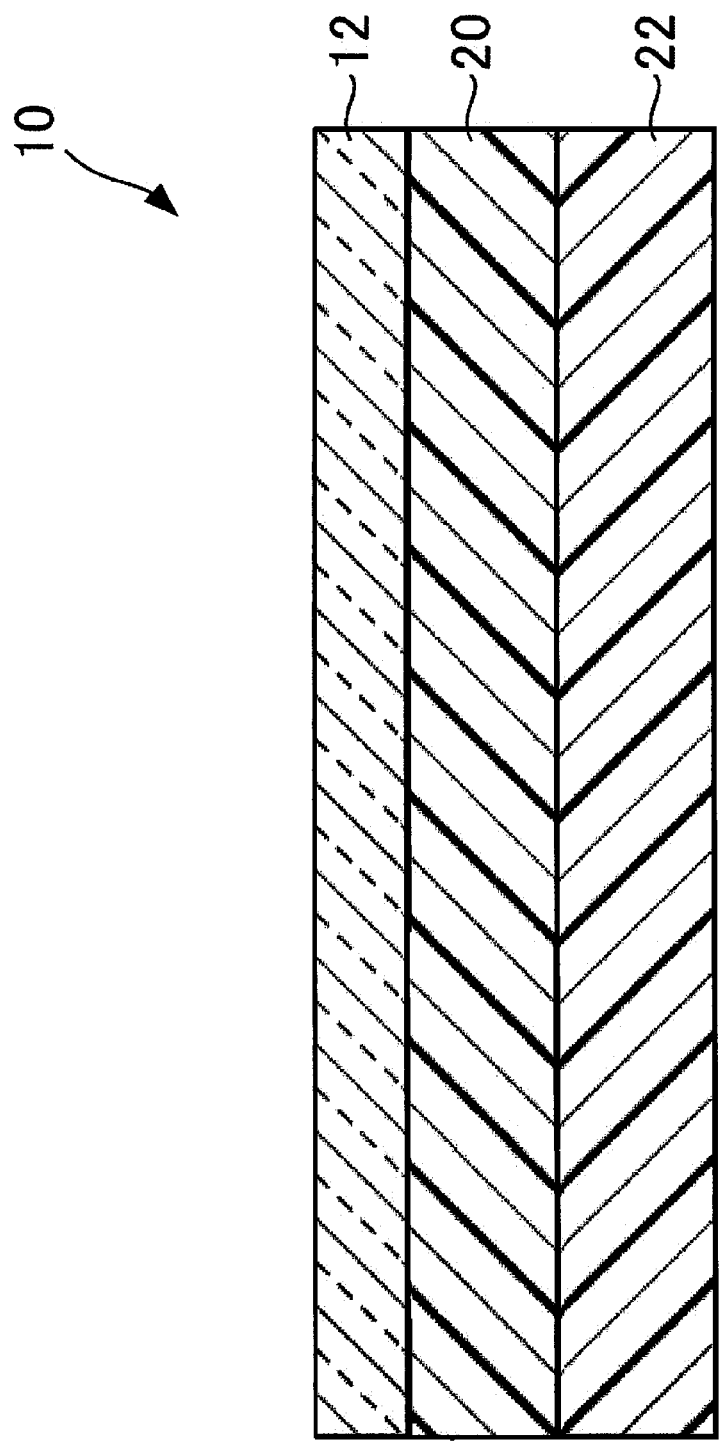

HARD-COAT COMPOSITION, LAMINATE FILM, AND CURABLE FILM

TECHNICAL FIELD

The present invention relates to a hard-coat composition, in particular, a curable hard-coat composition, a laminate film comprising the hard-coat composition, and the like.

BACKGROUND ART

Resin film laminates having a hard-coat layer are conventionally used in various fields (see Patent document 1). For example, such resin film laminates are used in front and rear panels of mobile devices, automobile interior parts and the like.

PRIOR ART DOCUMENT

Patent Document

Patent document 1: Japanese Unexamined Patent Application Publication (translation of PCT) No. 2017-508828

SUMMARY OF THE INVENTION

Problems to be Solved by the Invention

A hard-coat layer used for protecting a surface of a resin film laminate is required to have certain levels of hardness and scratch resistance. Meanwhile, resin films forming the respective layers are required to have satisfying moldability to produce a resin film laminate having a desired shape. Accordingly, it has been difficult to satisfy all of these distinct characteristics in a resin composition that is used for producing a laminate, particularly, a hard-coat layer.

Thus, the objective of the present invention is to provide a hard-coat composition that enables production of a hard-coat layer having excellent scratch resistance and high hardness when cured and that also has excellent moldability upon processing, and to provide a laminate film having such a hard-coat composition, and the like.

Means for Solving the Problems

The present inventors found that a curable hard-coat composition containing certain polymer and nanoparticles has excellent characteristics that enables the above-described objective to be achieved, thereby accomplishing the present invention.

Thus, the present invention is as follows.

(1) A curable hard-coat composition comprising a (meth)acryloyl polymer and inorganic oxide nanoparticles, wherein the (meth)acryloyl polymer has a (meth)acrylate equivalent of 200-500 g/eq and a weight average molecular weight of 5,000-200,000, and
the average particle size of the inorganic oxide nanoparticles is 6 nm to less than 95 nm.

(2) The hard-coat composition according to (1) above, wherein the (meth)acryloyl polymer comprises the repeat unit represented by Formula (I) below:

[Chemical formula 1]

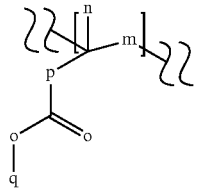

(I)

(in Formula (I) above,
m is a C1-4 alkylene group or a single bond,
n is a C1-4 alkyl group or hydrogen,
p is a single bond or a C1 or C2 alkylene group, and
q is hydrogen or an alkyl group having a total carbon number of 1-12 that may contain at least one substituent selected from an epoxy group, a hydroxy group, an acryloyl group and a methacryloyl group).

(3) The hard-coat composition according to (2) above, wherein, in Formula (I) above,
m is a C1 or C2 alkylene group,
n is a C1 or C2 alkyl group,
p is a single bond or a methylene group, and
q is hydrogen or an alkyl group having a total carbon number of 1-6 that may contain at least one substituent selected from a glycidyl group, a hydroxy group and an acryloyl group.

(4) The hard-coat composition according to (2) above, wherein the (meth)acryloyl polymer comprises at least one of the repeat units represented by Formulae (II-a), (II-b) and (II-c) below:

[Chemical formula 2]

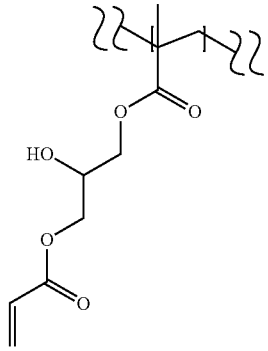

(II-a)

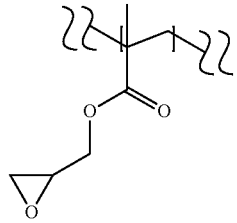

(II-b)

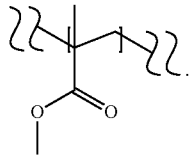

(II-c)

(5) The hard-coat composition according to any one of (1) to (4) above, wherein the hard-coat composition comprises the (meth)acryloyl polymer in an amount of 20-80 wt % and the inorganic oxide nanoparticles in an amount of 80-20 wt % with respect to the total weight of the hard-coat composition.
(6) The hard-coat composition according to any one of (1) to (5) above, wherein the inorganic oxide nanoparticles comprise silica having a copolymerizable group on its surface.
(7) The hard-coat composition according to any one of (1) to (6) above, further comprising a leveling agent.
(8) The hard-coat composition according to (7) above, wherein the leveling agent comprises a fluorine-based additive or a silicone-based additive.
(9) The hard-coat composition according to either one of (7) and (8) above, wherein the hard-coat composition comprises the leveling agent in an amount of 10 wt % or less with respect to the total weight of the hard-coat composition.
(10) The hard-coat composition according to any one of (1) to (9) above, which is energy beam-curable.
(11) The hard-coat composition according to any one of (1) to (10) above, further comprising a photopolymerization initiator.
(12) The hard-coat composition according to any one of (1) to (11) above, wherein:
provided that a base layer made of a laminate of a polycarbonate resin and a PMMA resin is coated with the hard-coat composition such that a coating layer is formed to a thickness of 7 μm on the surface of said base layer on the PMMA resin side, and the resultant is dried at 120° C. for 5 minutes and cut into 210 mm×297 mm×0.3 mm (thickness) to give a laminate specimen,
when said laminate is preheated at 190° C. for 40 seconds, and said specimen is placed into a mold having a right angle projection that has a height of 13 mm for deep drawing and a width and a length of 30 mm respectively such that the surface of the base layer on the polycarbonate resin side makes contact therewith, so as to subject said laminate specimen to pressure forming using compressed air at a pressure of 3.5 MPa,
radius R of the area where the resulting pressure-formed article is making contact with said right angle projection of the mold is 3 mm or less, and no crack is caused in the coating layer on the pressure-formed article.
(13) The hard-coat composition according to any one of (1) to (12) above, wherein:
provided that a base layer made of a laminate of a polycarbonate resin and a PMMA resin is coated with the hard-coat composition such that a coating layer is formed to a thickness of 7 μm on the surface of said base layer on the PMMA resin side, and the resultant is dried at 120° C. for 5 minutes,
When a polypropylene masking film with a thickness of 30 μm is attached to the surface of said uncured coating layer, and a pressure of 30 kg/m² is applied to the masking film for 24 hours, surface roughness Sa of the surface of said coating layer after peeling off the masking film is less than 0.01 μm.
(14) A laminate film comprising a coating layer having the hard-coat composition according to any one of (1) to (13) above on a base layer containing a resin.
(15) The laminate film according to (14) above, wherein the thickness of the base layer is 0.1 mm-1.0 mm and the thickness of the coating layer is 1.0 μm-10 μm.
(16) A cured film obtained by curing the laminate film according to either one of (14) and (15) above.
(17) The cured film according to (16) above, wherein the pencil hardness of the surface on the coating layer side is B or harder.
(18) The cured film according to either one of (16) and (17) above, wherein when the surface on the coating layer side is scratched with #0000 steel wool back and forth for 15 times under a pressure of 100 gf/cm², change in the haze of the coating layer before and after scratching (ΔH) as evaluated in accordance with JIS K 7136: 2000 is less than 3.0%.
(19) The cured film according to any one of (16) to (18) above, wherein the score of adhesiveness on the coating layer side is 0 according to an evaluation defined by JIS K 5600-5-6: 1999.

Advantageous Effect of the Invention

A hard-coat composition of the present invention comprises specific polymer and nanoparticles as described above, and capable of forming a hard-coat layer having high hardness and excellent scratch resistance once cured, and which has excellent moldability in a state prior to curing.

Since the hard-coat composition of the present invention has such excellent characteristics, it is particularly suitable, for example, as a material of a resin film laminate used for applications such as mobile devices, automobile interior parts and the like.

BRIEF DESCRIPTION OF THE DRAWINGS

FIG. 1 A cross-sectional view showing a specific example of a laminate film including a coating layer comprising a hard-coat composition.

EMBODIMENTS FOR CARRYING OUT THE INVENTION

Hereinafter, the present invention will be described in detail. The present invention is not limited to the following embodiments, and may be modified and carried out in any way as long as the invention can exert its effect.

[Hard-Coat Composition]

A hard-coat composition of the present invention has a property of being cured by irradiation with an energy beam or the like, and contains a (meth)acryloyl polymer and inorganic oxide nanoparticles. As will be described in detail below, the hard-coat composition has excellent moldability and tack-free property prior to curing, and can realize high hardness and excellent scratch resistance once it is cured, for example, to form a hard-coat layer.

Preferably, the hard-coat composition contains a (meth)acryloyl polymer in an amount of 20-80 wt % and inorganic oxide nanoparticles in an amount of 80-20 wt % with respect to the total amount of the hard-coat composition. More preferably, the hard-coat composition contains a (meth)acryloyl polymer in an amount of 30-70 wt % and inorganic oxide nanoparticles in an amount of 70-30 wt %. Still more preferably, the hard-coat composition contains a (meth)acryloyl polymer in an amount of 40-60 wt % and inorganic oxide nanoparticles in an amount of 60-40 wt %.

<(Meth)Acryloyl Polymer>

The (meth)acryloyl polymer has a (meth)acrylate equivalent of 200-500 g/eq. The (meth)acrylate equivalent of the (meth)acryloyl polymer is preferably 220-450 g/eq and more preferably 250-400 g/eq.

Moreover, the (meth)acryloyl polymer preferably has a double bond equivalent of 100-1000 g/eq, which is more preferably 150-800 g/eq, still more preferably 200-600 g/eq and particularly preferably 250-400 g/eq.

Furthermore, the (meth)acryloyl polymer has a weight average molecular weight of 5,000-200,000. The weight average molecular weight of the (meth)acryloyl polymer is preferably 10,000-150,000, more preferably 15,000-100,000 and still more preferably 18,000-50,000.

The weight average molecular weight can be measured based on the description in paragraphs 0061-0064 of Japanese Unexamined Patent Application Publication No. 2007-179018. Hereinafter, the measurement method will be described in detail.

TABLE 1

| | Conditions for measuring weight average molecular weight |
|---|---|
| Device | "Aliance" available from Waters |
| Columns | "Shodex K-805L" available from Showa Denko K.K. (2 columns) |
| Detector | UV detector: 254 nm |
| Eluent | Chloroform |

Specifically, a calibration curve representing the relationship between the elution time and the molecular weight of polycarbonate was first prepared by universal calibration using polystyrene as standard polymers. Then, an elution curve (chromatogram) of the polycarbonate was determined under the same conditions as the above-described calibration curve. Furthermore, a weight average molecular weight (Mw) was calculated from the elution time (molecular weight) of the polycarbonate and the peak area of the corresponding elution time (number of molecules). The weight average molecular weight can be expressed by Equation (A) below, where Ni represents the number of molecules having molecular weight Mi.

$$Mw=\Sigma(NiMi^2)/\Sigma(NiMi) \quad (A)$$

Herein, (meth)acrylate refers to both acrylate and methacrylate.

As described above, a hard-coat composition containing a (meth)acryloyl polymer having a (meth)acrylate equivalent and a weight average molecular weight in prescribed ranges has good tack-free property prior to curing and good scratch resistance after curing, and is also capable of facilitating curing/polymerization reactions.

The (meth)acryloyl polymer contained in the hard-coat composition preferably has a repeat unit represented by Formula (I) below.

[Chemical formula 3]

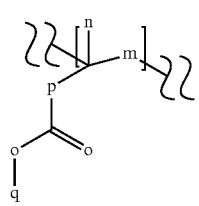
(I)

In Formula (I), m is a C1-4 alkylene group or a single bond, n is a C1-4 alkyl group or hydrogen, p is a single bond or a C1 or C2 alkylene group, and q is hydrogen or an alkyl group having a total carbon number of 1-12 that may contain at least one substituent selected from an epoxy group, a hydroxy group, an acryloyl group and a methacryloyl group.

More preferably, the (meth)acryloyl polymer contains the following repeat unit, namely, a repeat unit represented by Formula (I) above where m is a C1 or C2 alkylene group, n is a C1 or C2 alkyl group, p is a single bond or a methylene group, and q is hydrogen or an alkyl group having a total carbon number of 1-6 that may contain at least one substituent selected from a glycidyl group, a hydroxy group and an acryloyl group.

For example, in Formula (I) above, m is a methylene group, n is a methyl group, p is a single bond, and q is an alkyl group with a carbon number of 5 or less containing a methyl group or a glycidyl group (an epoxy group) or an alkyl group with a carbon number of 8 or less containing a hydroxy group or an acryloyl group.

Specific example of the repeat unit contained in the (meth)acryloyl polymer include those represented by Formulae (II-a), (II-b) and (II-c) below.

[Chemical formula 4]

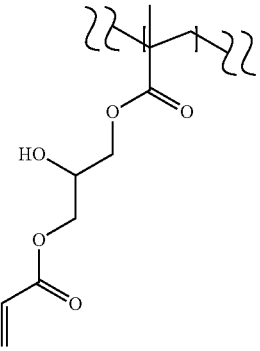
(II-a)

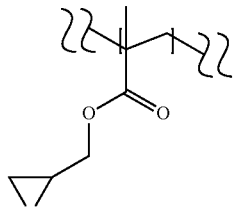
(II b)

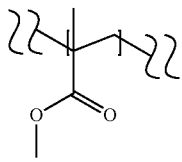
(II-c)

In the (meth)acryloyl polymer, the repeat unit represented by Formula (II-a) above is in an amount of preferably 30-85 mol % and more preferably 40-80 mol % with respect to the total number of moles of the repeat units represented by Formulae (II-a), (II-b) and (II-c) above. The repeat unit represented by Formula (II-b) above is in an amount of preferably 5-30 mol % and more preferably 10-25 mol % with respect to said total number of moles. In addition, the repeat unit represented by Formula (II-c) above is in an amount of preferably 10-40 mol % and more preferably 10-35 mol % with respect to said total number of moles.

Furthermore, the mole ratio of the repeat units represented by Formulae (II-a), (II-b) and (II-c) above is preferably 4.5-5.5:1.5-2.5:2.5-3.5, for example, 5:2:3.

The (meth)acryloyl polymer may be added with a pentaerythritol-based polyfunctional acrylate compound. As a polyfunctional acrylate compound having multiple acrylate groups, preferably three or more acrylate groups, for example, pentaerythritol tetraacrylate and dipentaerythritol hexaacrylate represented by Formulae (III-a) and (III-b) below, respectively, as well as pentaerythritol triacrylate or the like may be used.

[Chemical formula 5]

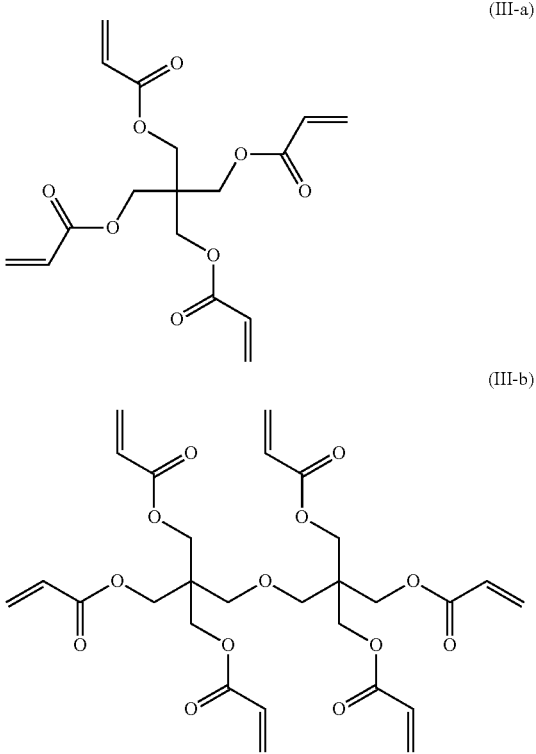

The polyfunctional acrylate compound is contained in an amount of preferably 70 wt % or less and more preferably 50 wt % or less with respect to the total weight with the (meth)acryloyl polymer. Thus, the polyfunctional acrylate compound can be added to the hard-coat composition so that it can react with the acryloyl group, the glycidyl group (epoxy group) and the hydroxy group contained in the side chain of the (meth)acryloyl polymer, thereby forming a hard-coat membrane having improved scratch resistance.

<Inorganic Oxide Nanoparticles>

The inorganic oxide nanoparticles contained in the hard-coat composition may be silica particles, alumina particles or the like, among which the inorganic oxide nanoparticles preferably comprises silica particles, where the silica particles preferably contain at least colloidal silica.

The inorganic oxide nanoparticles contained in the hard coat are preferably treated with a surface treatment agent. By this surface treatment, the inorganic oxide nanoparticles can be dispersed stably in the hard-coat composition, particularly in the (meth)acryloyl polymer component.

The surface treatment agent used for the inorganic oxide nanoparticles is preferably a compound having a substituent that can bind to the surface of the inorganic oxide nanoparticles and a substituent highly compatible with the component of the hard-coat composition, particularly, the (meth) acryloyl polymer, in which the inorganic oxide nanoparticles are to be dispersed. Examples of the surface treatment agent include a silane compound, alcohol, an amine, carboxylic acid, sulfonic acid, phosphonic acid and the like.

The inorganic oxide nanoparticles preferably have a copolymerizable group on their surface. The copolymerizable group can be incorporated by a surface treatment of the inorganic oxide nanoparticles. Specific examples of the copolymerizable group include a vinyl group, a (meth) acrylate group and a free radical polymerizable group.

The average particle size of the inorganic oxide nanoparticles is 6 nm to less than 95 nm. The average particle size of the inorganic oxide nanoparticles is more preferably 7-50 nm and still more preferably 8-20 nm.

In order to avoid unevenness of the surface after curing the hard-coat composition and achieve good surface appearance, inorganic oxide nanoparticles that do not aggregate as much as possible are preferably used.

<Other Components in Hard-Coat Composition>

In addition to the above-described (meth)acryloyl polymer and inorganic oxide nanoparticles, the hard-coat composition preferably further comprises a leveling agent. Examples of the leveling agent include a fluorine-based additive, a silicone-based additive and the like.

MEGAFACE RS-56, RS-75, RS-76-E, RS-76-NS, RS-78 and RS-90 available from DIC, Ftergent 710FL, 220P, 208G, 601AD, 602A, 650A and 228P, and Ftergent 240GFTX-218 available from NEOS (all of them are oligomers containing a fluorine group and UV-reactive group) and the like can be used as the fluorine-based additive, among which Ftergent 601AD and the like are favorable as the fluorine-based additive.

Moreover, BYK-UV3500 and BYK-UV3505 available from BYK-Chemie GmbH (all of them are polyether-modified acrylate functional polydimethylsiloxanes) a) and the like can be used as the silicone-based additive, among which BYK-UV3500 and the like are preferable as the silicone-based additive.

A leveling agent is preferably contained in the hard-coat composition in an amount of 0.1 wt % to 10 wt % with respect to the total amount of the hard-coat composition. The content of the leveling agent in the hard-coat composition is more preferably 0.5 wt % to 7 wt % and still more preferably 1 wt % to 5 wt %.

Furthermore, while the curable hard-coat composition may be either energy beam-curable or thermally curable, it is preferably energy beam-curable and more preferably UV curable. Accordingly, the hard-coat composition preferably further contains a photopolymerization initiator. Examples of the photopolymerization initiator include IRGACURE 184 (1-hydroxy-cyclohexyl-phenyl-ketone), IRGACURE 1173 (2-hydroxy-2-methyl-1-phenyl-propane-1-one), IRGACURE TPO (2,4,6-trimethylbenzoyl-diphenyl-phosphine oxide), IRGACURE 819 (bis(2,4,6-trimethylbenzoyl)-phenylphosphine oxide) and Esacure ONE (oligo(2-hydroxy-2-methyl-1-[4-(1-methylvinyl)phenyl]propanone), among which IRGACURE TPO or the like is favorable as the photopolymerization initiator in terms of heat resistance.

A photopolymerization initiator is contained in the hard-coat composition in an amount of 1 wt % to 6 wt % with respect to the total amount of the hard-coat composition. The content of the photopolymerization initiator in the hard-coat composition is more preferably 2 wt % to 5 wt % and still more preferably 3 wt % to 4 wt %.

The hard-coat composition may contain other additives, for example, at least one additive selected from the group consisting of a heat stabilizer, an antioxidant, a flame retardant, a flame-retardant auxiliary, a UV absorber, a mold release agent and a colorant. An antistatic agent, a fluorescent brightening agent, an anti-fog agent, a fluidity modifier, a plasticizer, a dispersant, an antibacterial agent and the like can also be added to the hard-coat composition as long as the desired physical properties are not significantly impaired.

The (meth)acryloyl polymer and the inorganic oxide nanoparticles are contained in the hard-coat composition in an amount of, preferably 60 mass % or more, still more preferably 80 mass % or more and particularly preferably 90 mass % or more. Accordingly, the content of the components other than the above-described two primary components in the hard-coat composition is preferably less than 40 mass %, more preferably less than 20 mass % and particularly preferably less than 10 mass %.

<Production of Hard-Coat Composition>

The hard-coat composition can be produced by blending the materials, namely, the above-described (meth)acryloyl polymer, inorganic oxide nanoparticles and the like. For example, the components including the (meth)acryloyl polymer and the like are mixed in a tumbler, and the mixture is further melt-kneaded in an extruder to produce a (meth)acryloyl polymer. The form of the resin composition is not limited to pellets, and may be obtained as flakes, powder, a bulk or the like.

<Properties of Hard-Coat Composition>

(i) Tack-Free Property

The hard-coat composition of the present invention has an excellent tack-free property. Therefore, even if the hard-coat composition in an uncured state touches to other material, for example, a hand of the operator, the hard-coat composition can maintain its predetermined shape and can be prevented from partially attaching to the surface of the material touching the composition. Hence, the hard-coat composition having an excellent tack-free property can facilitate processing in which the composition is molded into a shape suitable for use and then cured. Furthermore, the hard-coat composition in an uncured state can conveniently be stored or distributed while maintaining its predetermined shape.

On the other hand, a resin composition having a poor tack-free property, for example, a resin composition composed mainly of a low-molecular-weight oligomer or the like, requires a curing step prior to molding into a shape suitable for various applications, and thus it is found to be poor in moldability.

(ii) Gloss (Appearance) after Peeling Off Mask

When the hard-coat composition of the present invention is processed into a film in an uncured state and a masking film is layered thereon and peeled off, the hard-coat composition can prevent unevenness to be caused on the film surface and can maintain high gloss.

As will be described later in detail, in such an evaluation test, the hard-coat composition of the present invention was confirmed to retain smooth and high gloss surface after the masking film was peeled off.

(iii) Moldability (Pressure Forming Property)

The hard-coat composition of the present invention also has excellent moldability in an uncured state. The moldability of the hard-coat composition can be evaluated, for example, as follows. Specifically, a hard-coat composition is applied and dried on a surface of a base layer to give a laminate, which is placed and heated on a mold having a projection to see if the sheet-shaped hard-coat composition can stretch appropriately along the projection upon pressure forming, to see if a crack is generated, and the like.

As will be described later in detail, in such an evaluation test, the hard-coat composition of the present invention was confirmed to be capable of stretching appropriately along the projections without generating a crack upon pressure forming.

(iv) Scratch Resistance

Excellent scratch resistance can be realized by curing the hard-coat composition of the present invention. As will be described later in detail, when a laminate having a layer composed of the hard-coat composition is cured to form a hard-coat layer, the scratch resistance of the surface of the hard-coat layer was confirmed to be superior to cured PMMA resins (polymethyl methacrylate resins) and resins for lenses.

(v) Hardness

The cured hard-coat composition has high hardness. Specifically, when the hard-coat composition is applied and cured on a PMMA base material, it can realize pencil hardness of B or harder as evaluated according to JIS K 5600-5-4: 1999. Pencil hardness of preferably F or harder and particularly preferably 2H or harder is realized on the surface of the cured hard-coat composition.

(vi) Adhesiveness

The cured hard-coat composition is also excellent in adhesiveness to a resin base material. Specifically, as will be described later in detail, when the hard-coat composition is applied and cured on a PMMA base material, it can give a score of 0 as evaluated according to JIS K 5600-5-6: 1999, which is preferable than 1-5.

[Laminate Film]

A laminate film of the present invention is obtained by layering a coating layer comprising, preferably composed of, the above-described hard-coat composition in an uncured state on either surface of a base layer containing a resin.

The base layer of the laminate film preferably contains a resin, and more preferably contains a thermoplastic resin. While the kind of the thermoplastic resin is not particularly limited, various resins can be used, for example, a polycarbonate (PC) resin, an acrylate resin such as polymethyl methacrylate (PMMA), polyethylene terephthalate (PET), triacetyl cellulose (TAC), polyethylene naphthalate (PEN), polyimide (PI), cycloolefin copolymer (COC), a norbornene-containing resin, polyethersulfone, cellophane, an aromatic polyamide or the like. Among others, the thermoplastic resin of the base layer preferably contains at least a polycarbonate resin.

While the kind of the polycarbonate resin contained in the base layer of the laminate film is not particularly limited as long as it includes a —[O—R—OCO]— unit that contains a carbonate ester bond in the main chain of the molecule (where R is an aliphatic or aromatic group or includes both aliphatic and aromatic groups, and has a linear or branched structure), it is preferably a polycarbonate having a bisphenol backbone, and particularly preferably a polycarbonate having a bisphenol A backbone or a bisphenol C backbone. The polycarbonate resin may also be a mixture or a copolymer of bisphenol A and bisphenol C. A bisphenol C-based polycarbonate resin, for example, a polycarbonate resin composed only of bisphenol C, or a polycarbonate resin of a mixture or a copolymer of bisphenol C and bisphenol A, can be used to enhance the hardness of the base layer.

In addition, the viscosity average molecular weight of the polycarbonate resin is preferably 15,000-40,000, more preferably 20,000-35,000 and still more preferably 22,500-25,000.

While the acrylate resin contained in the base layer of the laminate film is not particularly limited, it is, for example, a homopolymer of a (meth)acrylate ester exemplified by polymethyl methacrylate (PMMA) and methyl methacrylate (MMA), a copolymer of PMMA or MMA with one or more other monomers, or a mixture of these multiple kinds of resins. Among others, a (meth)acrylate including a cyclic alkyl structure having low birefringence, low hygroscopic property and excellent heat resistance is favorable. Examples of such (meth)acrylate resin include, but not limited to, ACRYPET (available from Mitsubishi Rayon Co., Ltd.), DELPET (available from Asahi Kasei Chemicals Corporation) and PARAPET (available from Kuraray Co., Ltd.).

Preferably, a laminate obtained by layering the above-described acrylate resin on an outer surface of a polycarbonate resin is used as a base material so that the hardness of the outer surface of the base layer can be improved.

In addition, the base layer of the laminate film may further contain an additive as a component other than the thermoplastic resin. Such additive may be, for example, at least one additive selected from the group consisting of a heat stabilizer, an antioxidant, a flame retardant, a flame-retardant auxiliary, a UV absorber, a mold release agent and a colorant. Moreover, an antistatic agent, a fluorescent brightening agent, an anti-fog agent, a fluidity modifier, a plasticizer, a dispersant, an antibacterial agent or the like may be added to the base layer.

The base layer of the laminate film contains a thermoplastic resin in an amount of preferably 80 mass % or more, more preferably 90 mass % or more and particularly preferably 95 mass % or more. The thermoplastic resin of the base layer contains a polycarbonate resin in an amount of preferably 80 mass % or more, more preferably 90 mass % or more and particularly preferably 95 mass % or more.

While the thickness of the base layer of the laminate film is not particularly limited, it is preferably 30-1000 µm (1 mm), more preferably 50-700 µm and particularly preferably 100-500 µm. Moreover, two or more base layers may be provided. If a plurality of base layers are to be provided, the total thickness of the base layers is, for example, 100-1000 µm and preferably about 200-500 µm.

The laminate film of the present invention is produced as follows. First, a base layer is produced by processing a material such as a resin composition into a layer shape (sheet shape) by a conventional technique such as extrusion molding or casting. An example of extrusion molding include a method in which pellets, flakes or powder of the resin composition is molten and kneaded in an extruder, then the resultant is extruded through a T-die or the like, and the resulting half molten sheet is cooled and solidified while pressing with rolls, thereby forming a sheet.

Then, a coating composition is applied and dried on an outer surface of the base layer consisting of a single layer or multiple layers, thereby forming a coating layer.

The thickness of the base layer of the laminate film is preferably 0.1 mm-1.0 mm. The thickness of the base layer is, for example, 0.2 mm-0.8 mm or 0.3 mm-0.7 mm.

The thickness of the coating layer of the laminate film is preferably 1.0 µm-10 µm. The thickness of the coating layer is, for example, 2.0 µm-8.0 µm or 3.0 µm-5.0 µm.

The laminate film has a structure, for example, as shown in FIG. 1. In a laminate film 10 exemplified in FIG. 1, a coating layer 12 composed mainly of, preferably composed only of, a hard-coat composition is layered on a surface of a base layer having a polymethyl methacrylate layer (PMMA resin layer) 20 and a polycarbonate layer (PC resin layer) 22, on the PMMA layer side.

[Curable Film]

The cured film of the present invention can be obtained by curing the above-described laminate film. Specifically, the laminate film has a curable coating layer, which can be cured to obtain a cured film. As a curing technique for this purpose, a technique such as photocuring and thermal curing can be employed.

As can be appreciated from the above-described properties of the hard-coat composition after curing, the surface of the cured film of the present invention on the coating layer side has excellent properties. Specifically, the surface of the cured film on the coating layer side can realize high pencil hardness (preferably, pencil hardness of B or harder as determined by JIS K 5600-5-4: 1999), high scratch resistance and excellent adhesiveness (for example, adhesiveness score of 0 as evaluated according to JIS K 5600-5-6: 1999).

EXAMPLES

Hereinafter, the present invention will be described more specifically by way of examples. The present invention, however, should not be limited to the following examples, and can be modified and carried out in any way without departing from the scope of the present invention.

[Production of Laminate]

First, a coating composition (coating solution) was prepared by mixing the compositions indicated in Table 2 below. Acryloyl polymers used for this were as follows.
  (a) Acryloyl polymer A: ART CURE RA-3602MI available from Negami Chemical Industrial Co., Ltd.
  (An acrylic polymer having a double bond at a side chain—(meth)acrylate equivalent 300 g/eq: double bond equivalent 300 g/eq)
  (b) Acryloyl polymer B: Star-501 available from Osaka Organic Chemical Industry Ltd.
  (A dendrimer polyacrylate (a highly-branched (dipentaerythritol hexaacrylate (DPHA)-linked) polyacrylate having an acrylate group at a terminal end: (meth)acrylate equivalent 120 g/eq)
  (c) Acryloyl polymer C: ART CURE OAP-5000 available from Negami Chemical Industrial Co., Ltd.
  (An acrylic polymer including a double bond at the side chain: (meth)acrylate equivalent 2000 g/eq: double bond equivalent 2000 g/eq)
  (d) Acrylic polymer D: ART RESIN UN-3320HC available from Negami Chemical Industrial Co., Ltd.
  (An urethane acrylate oligomer: (meth)acrylate equivalent 250 g/eq)

Furthermore, inorganic oxide particles (nanosilica) added to the coating solution were as follows.

Nanosilica: MEK-AC-2140Z available from Nissan Chemical Corporation (Organo silica sol (average particle size 10-15 nm: surface-modified silica sol)

To the resulting mixture, MEK was further added as a dilution solvent to prepare a coating solution having a solid content of 30 wt %, which was used to coat a PC/PMMA coextruded film (PC: Iupilon E-2000 available from Mitsubishi Engineering-Plastics Corporation, PMMA: Altuglas V020 available from ARKEMA; thickness of PMMA layer 45 µm: total thickness 0.3 mm) on the PMMA side.

The coating step was carried out using a #16 wire-wound rod, and the applied coating solution was dried at 120° C. for 5 minutes. The dried coating solution formed a coating layer with a thickness of about 7 μm. Subsequently, the coating layer was cured using a Fusion H valve (Fusion UV Systems) at an output of 90% while sending air at 1.8 m/min. UV irradiation was performed under the condition of 1000 mJ/cm².

[Evaluation of Properties]

The properties of the cured laminate obtained above and a laminate before drying and curing the coating layer (uncured laminate) were evaluated as follows.

<Tack-Free Property in Uncured State>

The tack-free property of the uncured laminate was evaluated by finger tack evaluation.

<Gloss (Appearance) after Peeling Off Masking in Uncured State>

A test piece including a base layer made of a laminate of a polycarbonate resin and a PMMA resin was prepared, and a hard-coat composition was coated onto the surface of the base layer of the test piece on the PMMA resin side to form a coating layer with a thickness of 7 μm, which was then dried at 120° C. for 5 minutes.

Then, a polypropylene masking film having a thickness of 30 μm was attached to the surface of the uncured coating layer. A pressure of 30 kg/m² was applied to the masking film. After 24 hours, the masking film was peeled off so as to determine the surface roughness Sa (in accordance with ISO25178) of the surface of the coating layer with a scanning white light interferometer microscope VS1530 available from Hitachi High-Tech Science Corporation.

Appearance was evaluated to be good for examples and comparative examples in which the surface roughness Sa was less than 0.01 μm.

<Moldability (Pressure Forming Property) in Uncured State>

A test piece including a base layer made of a laminate of a polycarbonate resin and a PMMA resin was prepared, and a hard-coat composition was coated onto the surface of the base layer of the test piece on the PMMA resin side to form a coating layer with a thickness of 7 μm, which was then dried at 120° C. for 5 minutes.

Then, a laminate specimen obtained by cutting the laminate into 210 mm×297 mm×0.3 mm (thickness) was preheated at 190° C. for 40 seconds, and placed in a mold that had a right angle projection with a deep drawing height of 13 mm and length and width of 30 mm such that the surface of the base layer on the polycarbonate resin side made contact with the mold, whereby the laminate specimen was subjected to pressure forming using compressed air at a pressure of 3.5 MPa.

Moldability was evaluated to be good for examples and comparative examples in which the radius R of the area where the pressure-formed article obtained was making contact with the right angle projection of the mold was 3 mm or less, and no crack was caused in the coating layer on the pressure-formed article.

Here, in the base layer made of the laminate of the polycarbonate resin and the PMMA resin, the thickness of the PMMA layer was 45 μm while the total thickness was 0.3 mm as described above.

<Scratch Resistance after Curing>

The surface of the cured coating layer was scratched with #0000 steel wool back and forth for 15 times under a pressure of 100 gf/cm². An absolute value of the change in haze (ΔH), that is, the different between the haze measured before the scratch test in advance and the haze measured after the scratch test in accordance with JIS K 7136: 2000, was calculated and evaluated. Scratch resistance was evaluated to be good for examples and comparative examples in which ΔH was less than 3.0%.

<Chemical Resistance after Curing>

Neutrogena SPF100 was applied to the surface of the cured coating layer and left at 80° C. for an hour. Then, the appearance was visually inspected. Chemical resistance was evaluated to be good for examples and comparative examples without a defect in the surface.

<Pencil Hardness after Curing>

Measurement was carried out under the conditions pursuant to JIS K 5600-5-4: 1999, and evaluation was carried out by determining the hardest pencil grade that did not leave scratch marks.

<Adhesiveness>

Adhesiveness was evaluated according to the method of JIS K5600-5-6: 1999. Adhesiveness was evaluated to be good for examples and comparative examples in which the evaluation score was 0.

The results from the measurements of the properties of the laminate films of the examples and the comparative examples are shown in Table 2.

TABLE 2

| | | Example 1 | Example 2 | Example 3 | Comparative example 1 | Comparative example 2 | Comparative example 3 | Comparative example 4 | Reference example 1 |
|---|---|---|---|---|---|---|---|---|---|
| Component | Acryloyl polymer A Solid content (weight part) | 50 | 30 | 70 | 100 | 0 | 0 | 0 | 90 |
| | Acryloyl polymer B Solid content (weight part) | 0 | 0 | 0 | 0 | 50 | 0 | 0 | 0 |
| | Acryloyl polymer C Solid content (weight part) | 0 | 0 | 0 | 0 | 0 | 50 | 0 | 0 |
| | Acryloyl polymer D Solid content (weight part) | 0 | 0 | 0 | 0 | 0 | 0 | 50 | 0 |
| | (Meth)acrylate equivalent (g/eq) | 300 | 300 | 300 | 300 | 120 | 2000 | 250 | 300 |
| | Acryloyl polymer (molecular weight) | 20000 | 20000 | 20000 | 20000 | 18000 | 15000 | 1500 | 20000 |
| | Dipentaerythritol hexaacrylate DPHA (weight part) | 0 | 20 | 0 | 0 | 0 | 0 | 0 | 0 |
| | Nanosilica (weight part) | 50 | 50 | 30 | 0 | 50 | 50 | 50 | 10 |
| | Photopolymerization initiator IRGACURE TPO (weight part) | 3 | 3 | 3 | 3 | 3 | 3 | 3 | 3 |
| | Leveling agent (silicon-based additive) BYK-UV3500 (weight part) | 1 | 1 | 1 | 1 | 1 | 1 | 1 | 1 |

TABLE 2-continued

| | | | Example 1 | Example 2 | Example 3 | Comparative example 1 | Comparative example 2 | Comparative example 3 | Comparative example 4 | Reference example 1 |
|---|---|---|---|---|---|---|---|---|---|---|
| Evaluation item | Before UV irradiation | Tack-free property | Good | Good | Good | Good | Poor | Good | Poor | Good |
| | | Appearance | Good | Good | Good | Good | Poor | Good | Poor | Good |
| | | Moldability | Good | Good | Good | Good | Good | Good | Poor | Good |
| | After UV irradiation | Scratch resistance | Good | Good | Good | Poor | Good | Poor | Good | Poor |
| | | Chemical resistance | Good | Good | Good | Good | Good | Good | Good | Good |
| | | Pencil hardness | 2H | 3H | 2H | 2H | 3H | H | 3H | 2H |
| | | Adhesiveness | Good | Good | Good | Good | Good | Good | Good | Good |

Acryloyl polymer A: ART CURE RA-3602MI available from Negami Chemical Industrial Co., Ltd.
Acryloyl polymer B: Star-501 available from Osaka Organic Chemical Industry Ltd.
Acryloyl polymer C: ART CURE OAP-5000 available from Negami Chemical Industrial Co., Ltd.
Acryloyl polymer D: ART RESIN UN-3320HC available from Negami Chemical Industrial Co., Ltd.
Nanosilica: Organo silica sol MEK-AC-2140Z available from Nissan Chemical Corporation (having average particle size of 10-15 nm and copolymerizable group on the surface)

DESCRIPTION OF REFERENCE NUMERALS

10 Laminate film
12 Coating layer
20 Polymethyl methacrylate layer (PMMA resin layer)
22 Polycarbonate layer (PC resin layer)

The invention claimed is:

1. A curable hard-coat composition comprising a (meth)acryloyl polymer and inorganic oxide nanoparticles, wherein:
the (meth)acryloyl polymer has a double bond equivalent of 100-1,000 g/eq and a weight average molecular weight of 5,000-200,000;
the average particle size of the inorganic oxide nanoparticles is 6 nm to less than 95 nm; and
the (meth)acryloyl polymer comprises repeat unit represented by Formula (I):

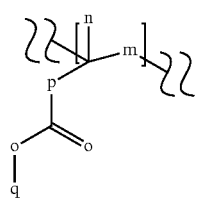

(I)

where:
m is a C1-4 alkylene group or a single bond,
n is a C1-4 alkyl group or hydrogen,
p is a single bond or a C1 or C2 alkylene group, and
q is hydrogen or an alkyl group having a total carbon number of 1-12 that may contain at least one substituent selected from an epoxy group, a hydroxy group, an acryloyl group and a methacryloyl group.

2. The hard-coat composition according to claim 1, wherein, in Formula (I) above,
m is a C1 or C2 alkylene group,
n is a C1 or C2 alkyl group,
p is a single bond or a methylene group, and
q is hydrogen or an alkyl group having a total carbon number of 1-6 that may contain at least one substituent selected from a glycidyl group, a hydroxy group and an acryloyl group.

3. The hard-coat composition according to claim 1, wherein the (meth)acryloyl polymer comprises at least one repeat unit represented by Formulae (II-a), (II-b) and (II-c) below:

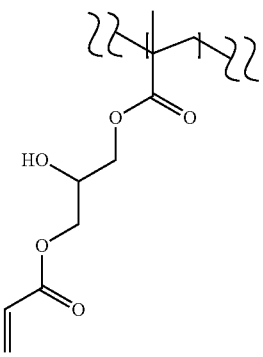

(II-a)

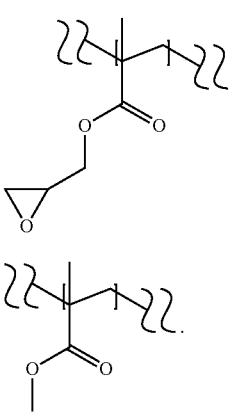

(II-b)

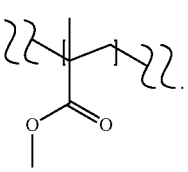

(II-c)

4. The hard-coat composition according to claim 1, wherein the hard-coat composition comprises the (meth)acryloyl polymer in an amount of 20-80 wt % and the inorganic oxide nanoparticles in an amount of 80-20 wt % with respect to the total weight of the hard-coat composition.

5. The hard-coat composition according to claim 1, wherein the inorganic oxide nanoparticles comprise silica having a copolymerizable group on its surface.

6. The hard-coat composition according to claim 1, further comprising a leveling agent.

7. The hard-coat composition according to claim 6, wherein the leveling agent comprises a fluorine-based additive or a silicone-based additive.

8. The hard-coat composition according to claim 6, wherein the hard-coat composition comprises the leveling agent in an amount of 10 wt % or less with respect to the total weight of the hard-coat composition.

9. The hard-coat composition according to claim 1, which is energy beam-curable.

10. The hard-coat composition according to claim 1, further comprising a photopolymerization initiator.

11. The hard-coat composition according to claim 1, wherein:
provided that a base layer made of a laminate of a polycarbonate resin and a PMMA resin is coated with the hard-coat composition such that a coating layer is formed to a thickness of 7 μm on the surface of said base layer on the PMMA resin side, and the resultant is dried at 120° C. for 5 minutes and cut into 210 mm×297 mm×0.3 mm (thickness) to give a laminate specimen,
when said laminate is preheated at 190° C. for 40 seconds, and said specimen is placed into a mold having a right angle projection that has a height of 13 mm for deep drawing and a width and a length of 30 mm respectively such that the surface of the base layer on the polycarbonate resin side makes contact with the mold, so as to subject said laminate specimen to pressure forming using compressed air at a pressure of 3.5 MPa,
radius R of the area where the resulting pressure-formed article is making contact with said right angle projection of the mold is 3 mm or less, and no crack is caused in the coating layer on the pressure-formed article.

12. The hard-coat composition according to claim 1, wherein:
provided that a base layer made of a laminate of a polycarbonate resin and a PMMA resin is coated with the hard-coat composition such that a coating layer is formed to a thickness of 7 μm on the surface of said base layer on the PMMA resin side, and the resultant is dried at 120° C. for 5 minutes,
when a polypropylene masking film with a thickness of 30 μm is attached to the surface of said uncured coating layer, and a pressure of 30 kg/m² is applied to the masking film for 24 hours, surface roughness Sa of the surface of said coating layer after peeling off the masking film is less than 0.01 μm.

13. A laminate film comprising a coating layer having the hard-coat composition according to claim 1 on a base layer containing a resin.

14. The laminate film according to claim 13, wherein the thickness of the base layer is 0.1 mm-1.0 mm and the thickness of the coating layer is 1.0 μm-10 μm.

15. A cured film obtained by curing the laminate film according to claim 13.

16. The cured film according to claim 15, wherein the pencil hardness of the surface on the coating layer side is B or harder.

17. The cured film according to claim 15, wherein when the surface on the coating layer side is scratched with #0000 steel wool back and forth for 15 times under a pressure of 100 gf/cm², change in the haze of the coating layer before and after scratching (ΔH) as evaluated in accordance with JIS K 7136: 2000 is less than 3.0%.

18. The cured film according to claim 15, wherein the score of adhesiveness on the coating layer side is 0 according to an evaluation defined by JIS K 5600-5-6: 1999.

19. The hard-coat composition according to claim 1, wherein the (meth)acryloyl polymer has a (meth)acrylate equivalent of 200-500 g/eq.

* * * * *